US012768853B2

(12) United States Patent
Nakajima et al.

(10) Patent No.: US 12,768,853 B2
(45) Date of Patent: Oct. 20, 2026

(54) AUTOMATIC ANALYZER

(71) Applicant: Hitachi High-Tech Corporation, Tokyo (JP)

(72) Inventors: Satoshi Nakajima, Tokyo (JP); Hiroyuki Mishima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 602 days.

(21) Appl. No.: 18/273,115

(22) PCT Filed: Feb. 10, 2022

(86) PCT No.: PCT/JP2022/005270
§ 371 (c)(1),
(2) Date: Jul. 19, 2023

(87) PCT Pub. No.: WO2022/190756
PCT Pub. Date: Sep. 15, 2022

(65) Prior Publication Data

US 2024/0302396 A1 Sep. 12, 2024

(30) Foreign Application Priority Data

Mar. 8, 2021 (JP) ................................ 2021-036067

(51) Int. Cl.
*G01N 35/04* (2006.01)
*G01N 35/00* (2006.01)

(52) U.S. Cl.
CPC ....... *G01N 35/04* (2013.01); *G01N 35/00732* (2013.01); *G01N 2035/00326* (2013.01);
(Continued)

(58) Field of Classification Search
CPC ............ G01N 35/04; G01N 35/00732; G01N 2035/00326; G01N 2035/00752;
(Continued)

(56) References Cited

U.S. PATENT DOCUMENTS 5,985,215 A * 11/1999 Sakazume ............ G01N 35/026 422/65
2011/0256022 A1 10/2011 Akutsu et al.
(Continued)

FOREIGN PATENT DOCUMENTS

CN 110873809 A * 3/2020 ............ G01N 35/04
JP 10-096734 A 4/1998
(Continued)

OTHER PUBLICATIONS

International Search Report of PCT/JP2022/005270 dated Mar. 15, 2022.
(Continued)

*Primary Examiner* — Jennifer Wecker
*Assistant Examiner* — Britney N. Washington
(74) *Attorney, Agent, or Firm* — MATTINGLY & MALUR, PC

(57) ABSTRACT

An automatic analyzer can be miniaturized as a whole and can accurately determine presence or absence of a sample container and a type thereof. The automatic analyzer of includes a conveyance line for conveying a loaded sample container; an identification information reading device that reads identification information attached to the sample container; and a container height detection device. The identification information reading device and the container height detection device perform reading and detection when the sample container is at a common position on the conveyance line. The container height detection device includes sensors having different height ranges for a detection target, a part of the sensors being disposed on the same side as the identification information reading device with respect to the conveyance line, and the rest of the sensors being disposed on the opposite side of the identification information reading device with respect to the conveyance line.

6 Claims, 11 Drawing Sheets

(52) U.S. Cl.
CPC .............. *G01N 2035/00752* (2013.01); *G01N 2035/00801* (2013.01); *G01N 2035/0465* (2013.01)

(58) Field of Classification Search
CPC . G01N 2035/00801; G01N 2035/0465; G01N 2035/00821
See application file for complete search history.

(56) References Cited

U.S. PATENT DOCUMENTS

| | | | | |
|---|---|---|---|---|
| 2015/0075298 | A1 | 3/2015 | Hecht | |
| 2016/0327587 | A1* | 11/2016 | Yasui ................. | G01N 35/1011 |
| 2021/0247412 | A1* | 8/2021 | Hiroki ................ | G01N 35/1002 |
| 2022/0011333 | A1* | 1/2022 | Nakajima .......... | G01N 35/1002 |

FOREIGN PATENT DOCUMENTS

| | | | |
|---|---|---|---|
| JP | 2009-204360 | A | 9/2009 |
| JP | 2010-151569 | A | 7/2010 |
| JP | 2015-505056 | A | 2/2015 |
| WO | 2015/105079 | A1 | 7/2015 |
| WO | 2016/017291 | A1 | 2/2016 |

OTHER PUBLICATIONS

Extended European Search Report received in corresponding European Application No. 22766721.9 dated Dec. 12, 2024.

* cited by examiner

[FIG. 1]
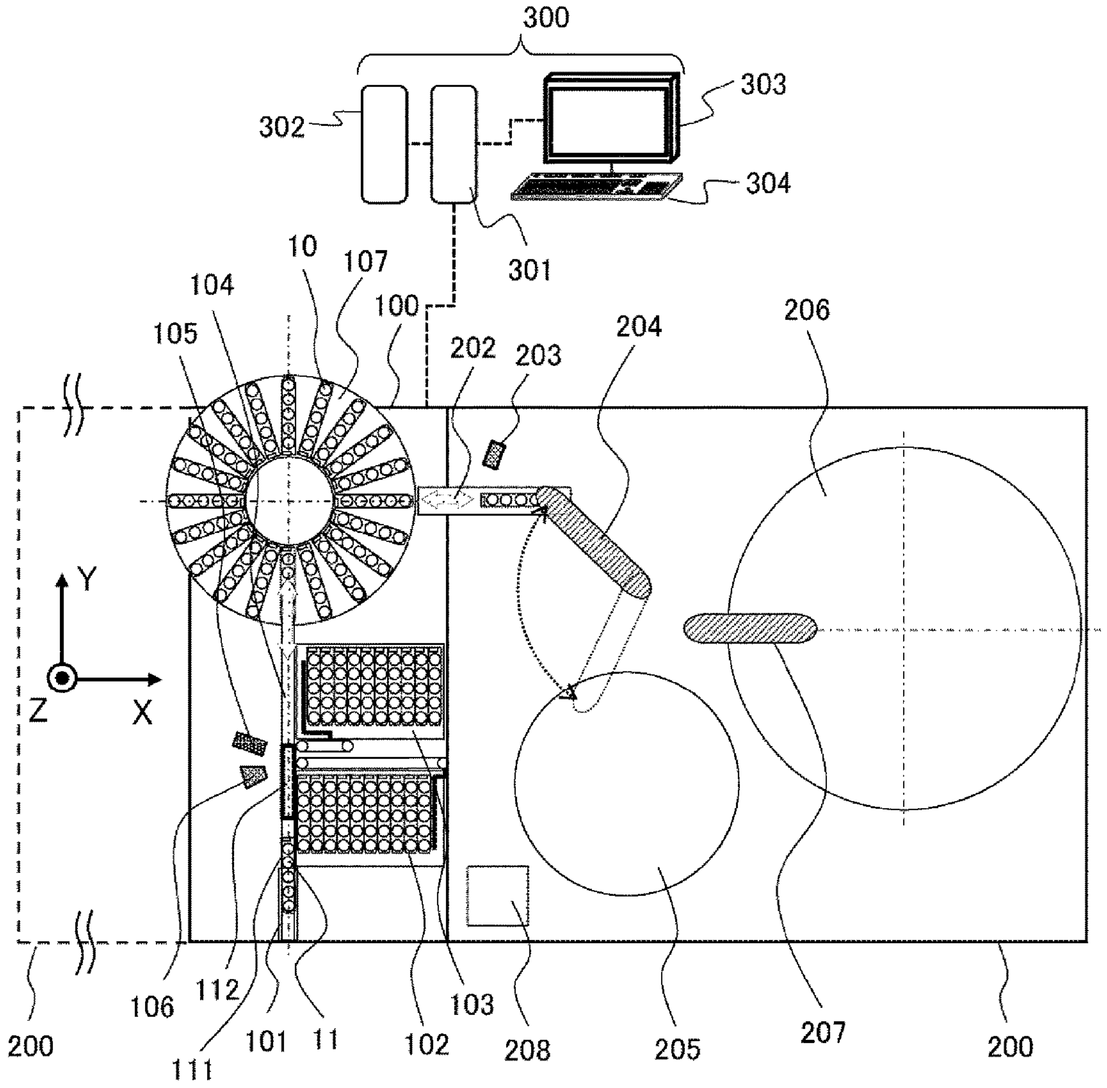

[FIG. 2]
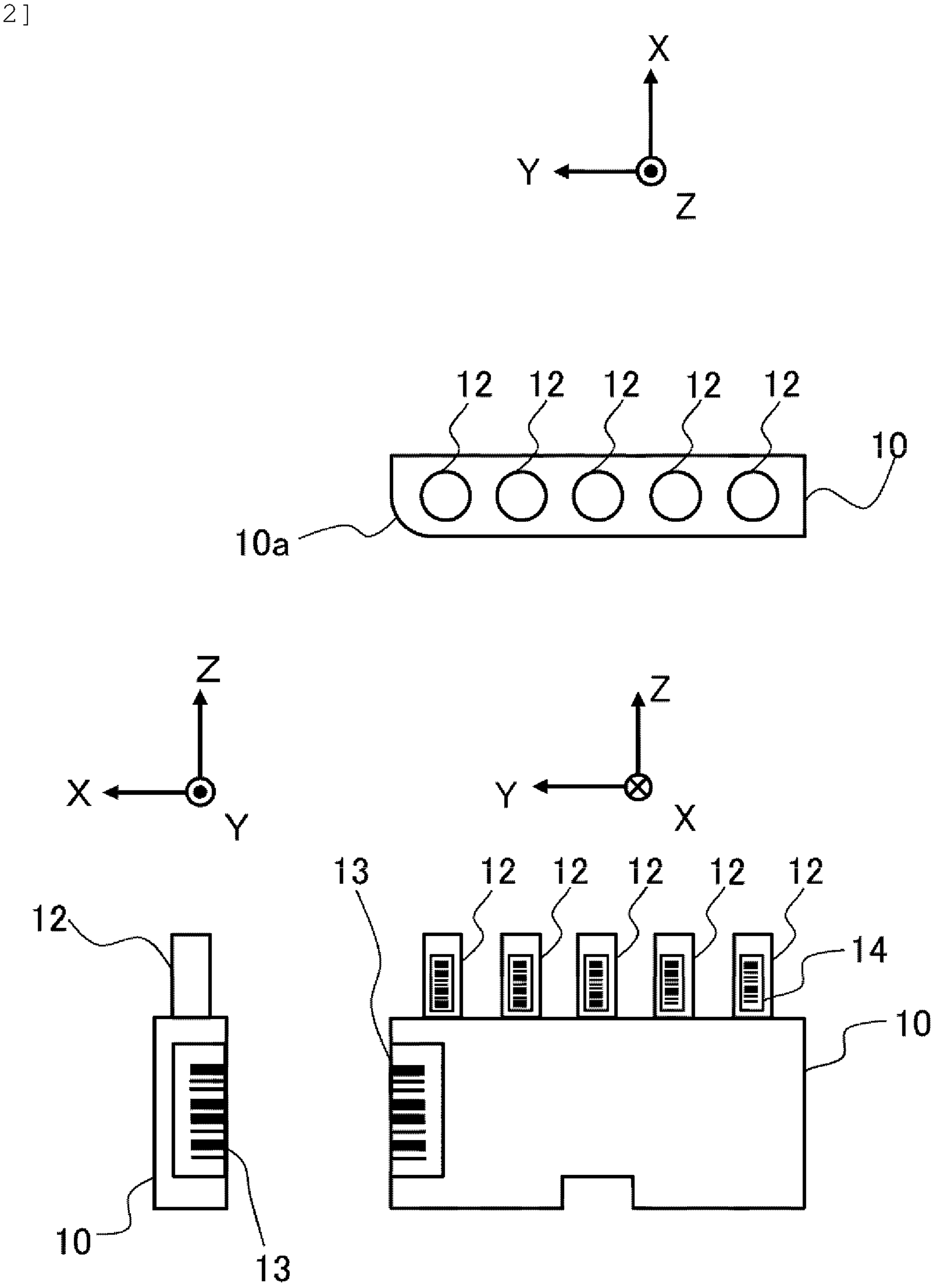

[FIG. 3]
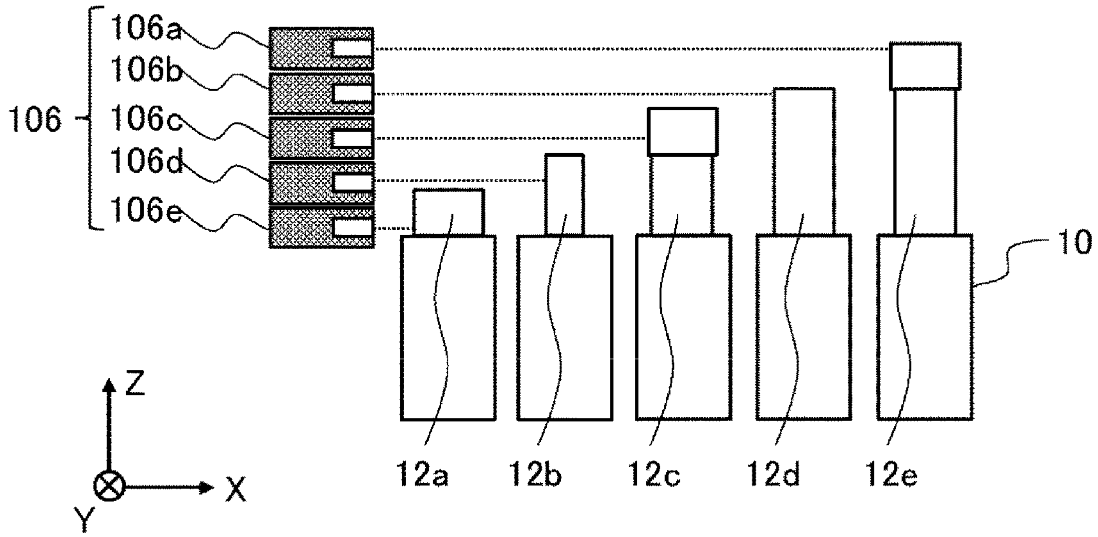
[FIG. 4]
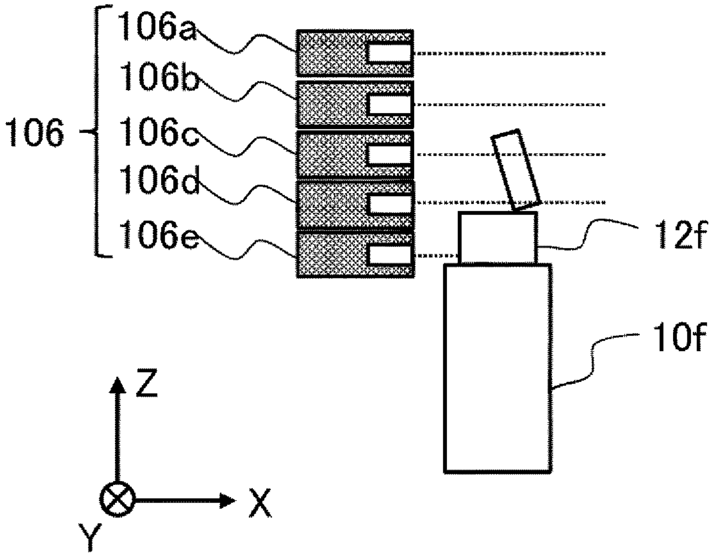

[FIG. 5]
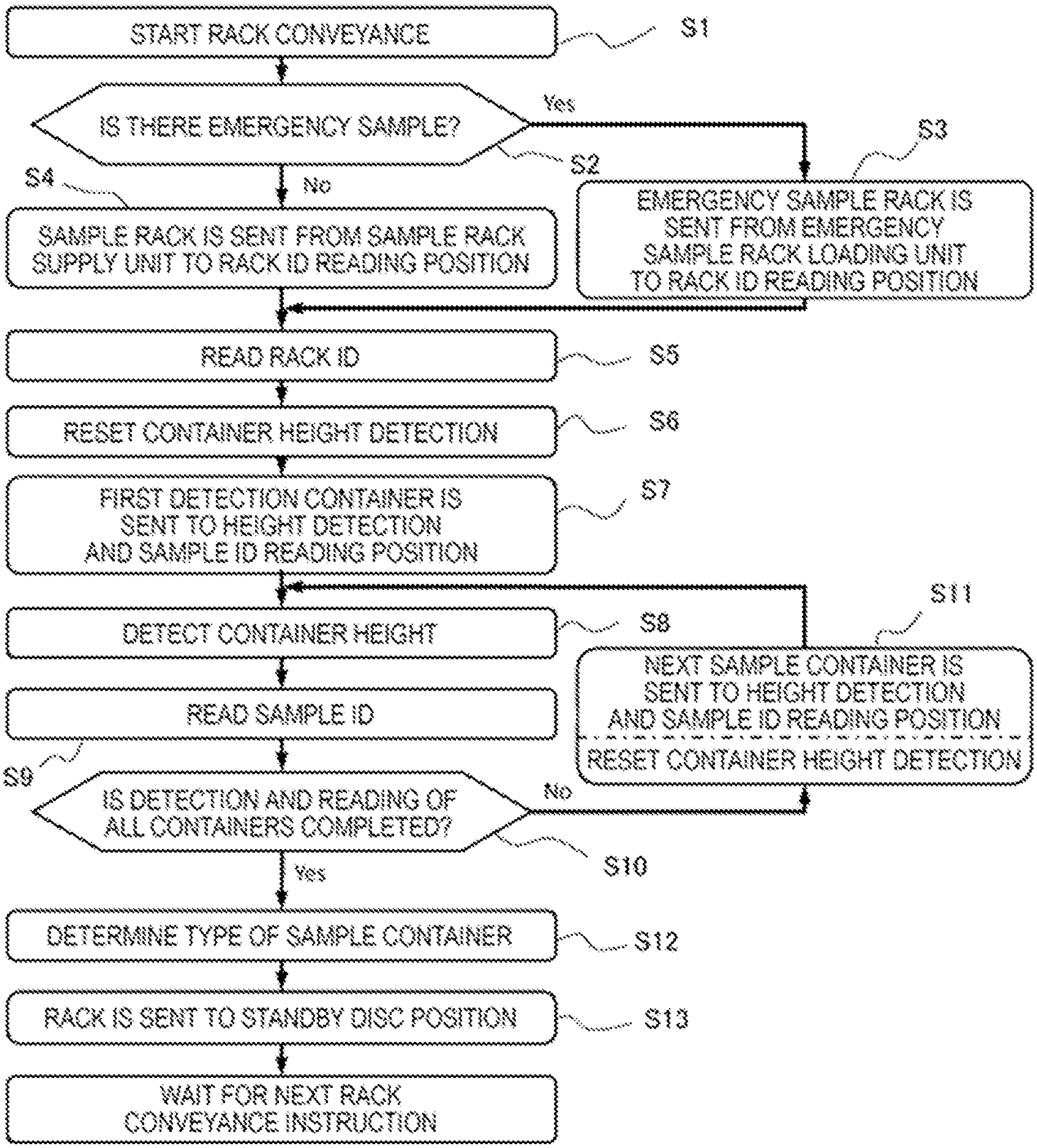

[FIG. 6]
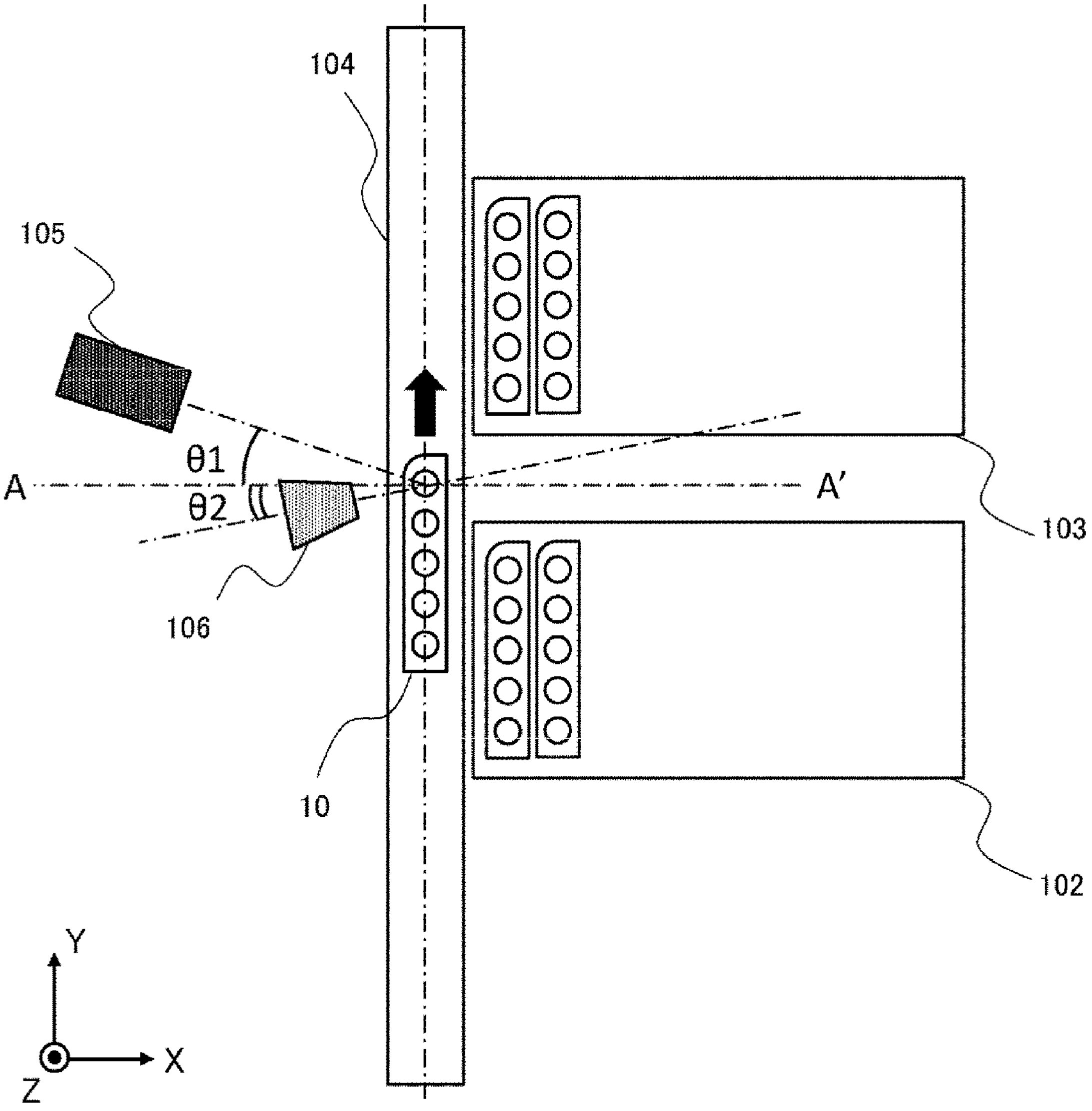

[FIG. 7]
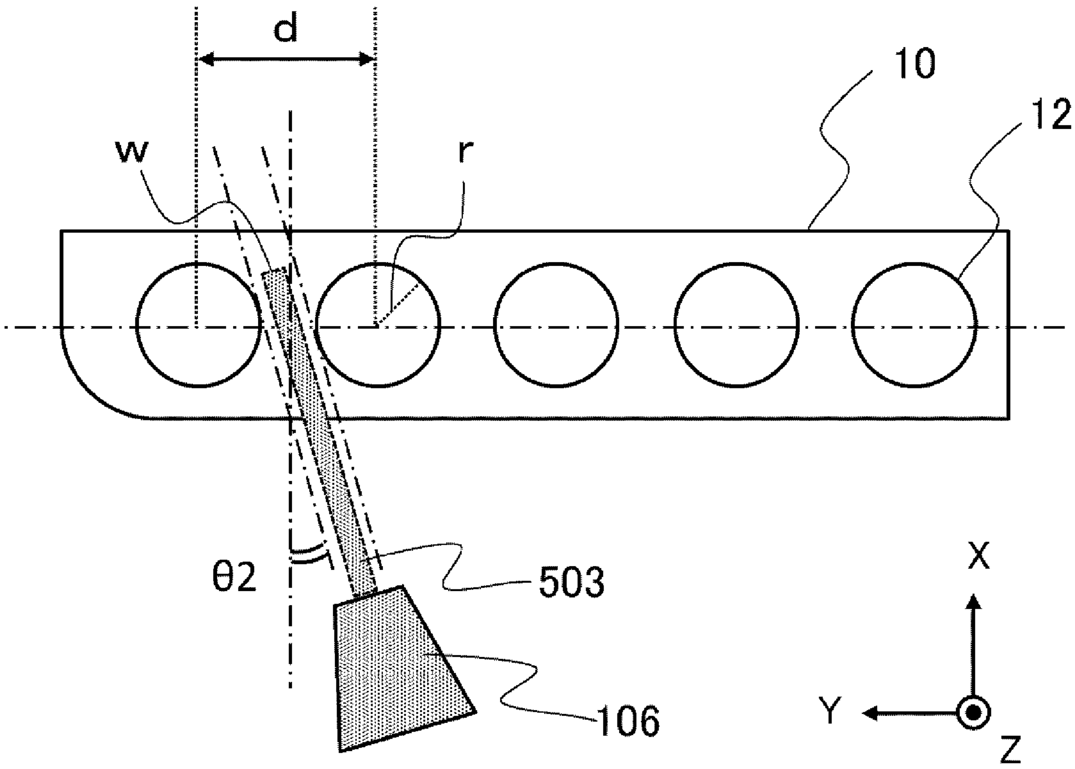

[FIG. 8]
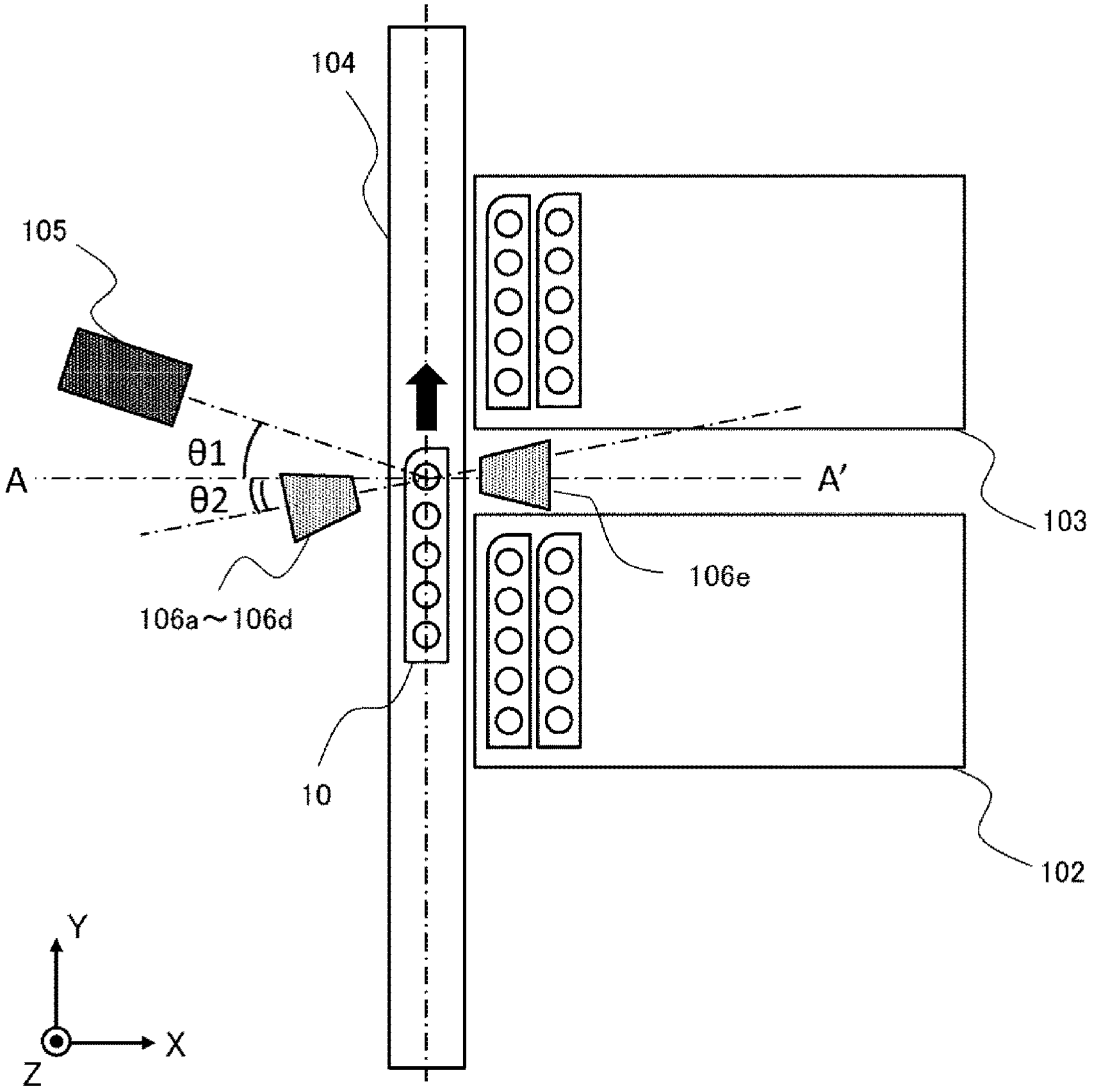

[FIG. 9A]
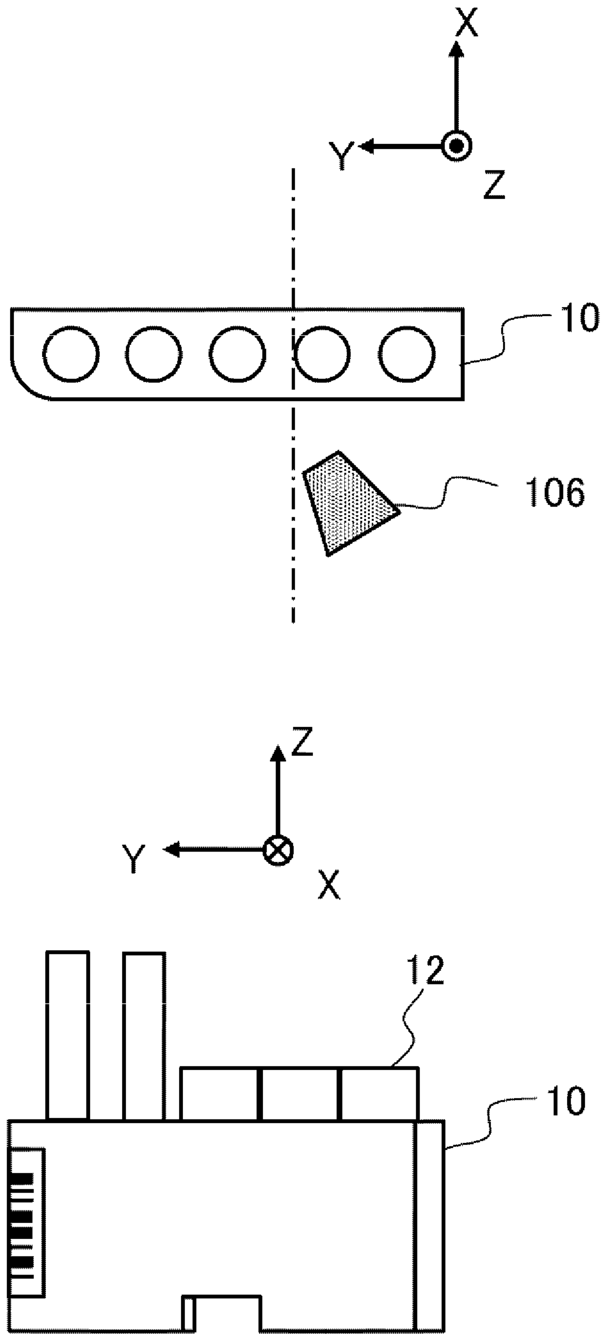

[FIG. 9B]
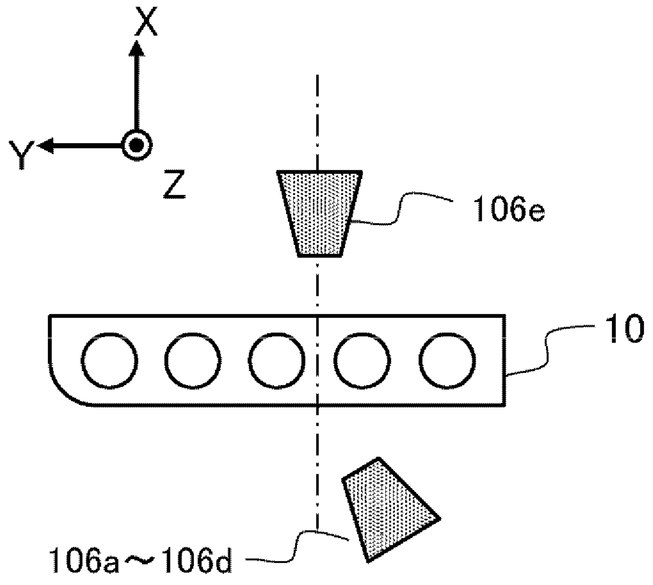
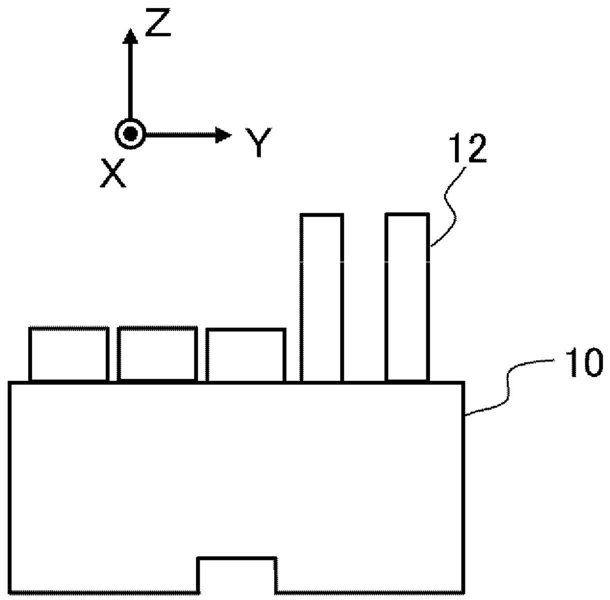

[FIG. 10A]
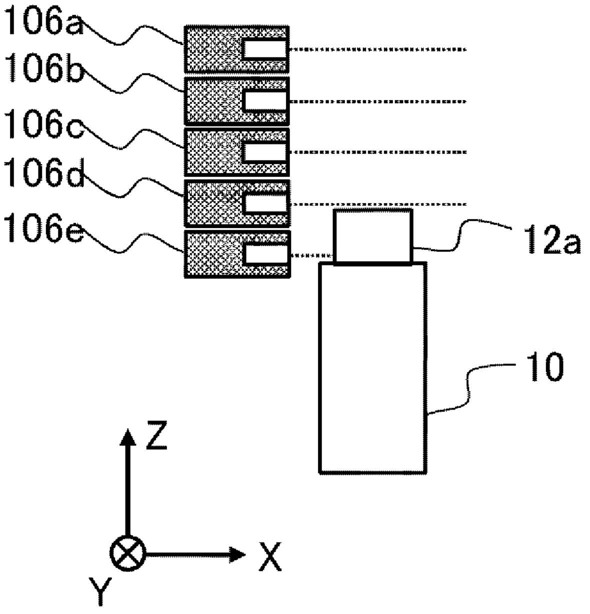
[FIG. 10B]
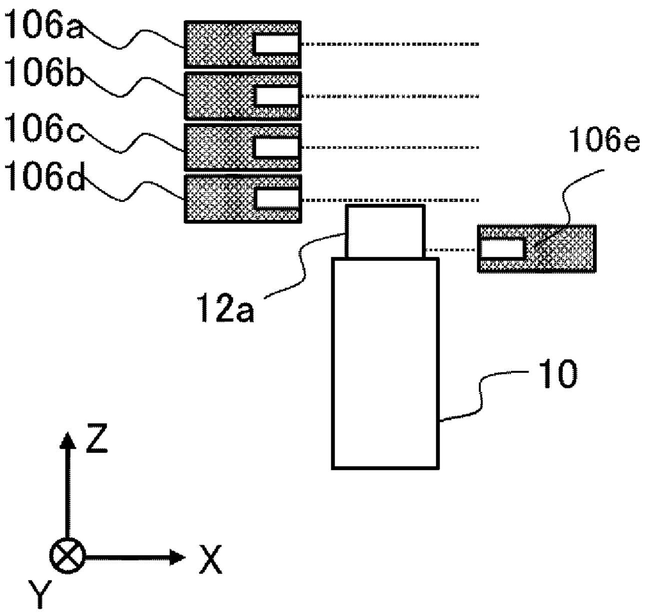

[FIG. 11A]
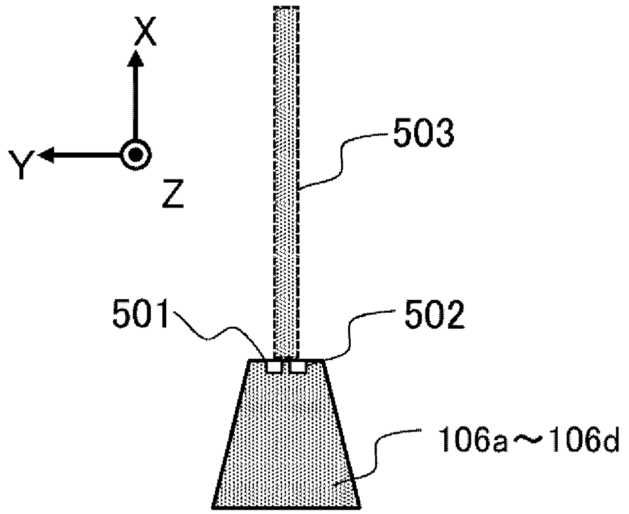
[FIG. 11B]
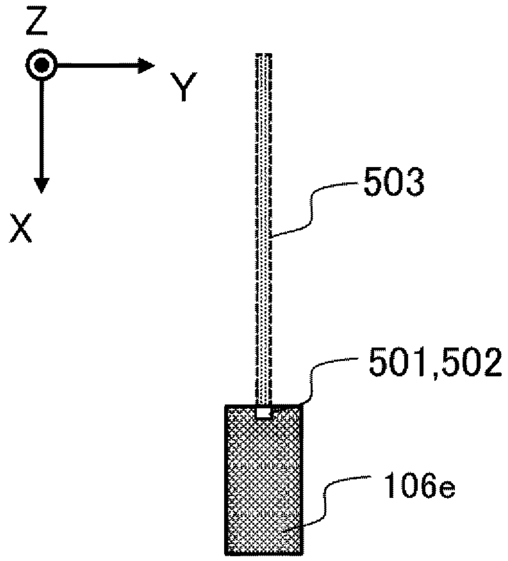

AUTOMATIC ANALYZER

TECHNICAL FIELD

The present invention relates to an automatic analyzer.

BACKGROUND ART

As an automatic analyzer, there is a stand-alone type in which an analysis unit for analyzing a sample is operated as an independent device, and a module type in which a plurality of analyzers in different types of analysis fields such as biochemistry and immunity are connected by a conveyance line for conveying a sample rack holding a sample container containing a sample, and operated as one device.

In particular, in the module type, since an analysis item differs depending on the sample, it is necessary to read identification information (rack ID) attached to each sample rack and determine a path before sorting the sample rack to an analysis module. There are also a plurality of types of sample containers having different shapes, and it is necessary to distinguish the types of sample containers before dispensing the sample in the analysis module.

PTL 1 discloses an automatic analyzer in which a sample rack loaded from a sample loading portion is sequentially conveyed to a rack ID reading position, a sample container height detection position, and a sample ID reading position (paragraphs 0024 to 0026).

CITATION LIST

Patent Literature

PTL 1: JP2010-151569A

SUMMARY OF INVENTION

Technical Problem

In the automatic analyzer disclosed in PTL 1, since the sample container height detection position and the sample ID reading position are located away from each other, there is a limit to shortening of a conveyance line for the sample rack and miniaturizing the entire device. When a container height detection device and an identification information reading device are disposed close to each other to detect a height of a sample container and read a sample ID of the sample container at a common position on the conveyance line, at least one of the devices needs to be disposed in an inclined manner with respect to the conveyance line. Therefore, according to an installation angle of the container height detection device, the height of the sample container may be detected erroneously, and presence or absence and a type of the sample container may not be determined.

An object of the invention is to provide an automatic analyzer that can be miniaturized as a whole and can accurately determine presence or absence and a type of a sample container.

Solution to Problem

In order to solve the above problems, an automatic analyzer according to the invention includes: a conveyance line for conveying a loaded sample container; an identification information reading device that reads identification information to the sample attached container; and a container height detection device that detects a height of the sample container, in which the identification information reading device and the container height detection device perform reading and detection when the sample container is at a common position on the conveyance line, the container height detection device includes a plurality of sensors having different height ranges for a detection target, a part of the plurality of sensors is disposed on the same side as the identification information reading device with respect to the conveyance line, and the rest of the plurality of sensors are disposed on an opposite side of the identification information reading device with respect to the conveyance line.

Advantageous Effects of Invention

According to the invention, it is possible to provide the automatic analyzer that can be miniaturized as a whole and can accurately determine presence or absence and a type of the sample container.

BRIEF DESCRIPTION OF DRAWINGS

FIG. 1 is a diagram illustrating a basic configuration of an automatic analyzer according to Embodiment 1.

FIG. 2 is a diagram illustrating a state in which a plurality of sample containers are mounted on a sample rack.

FIG. 3 is a diagram illustrating a structure of a container height detection device and a method for detecting a height of each sample container.

FIG. 4 is a diagram illustrating the structure of the container height detection device and a method for detecting a height of a sample container with a lid.

FIG. 5 is a flowchart illustrating a process of reading and detecting a rack ID, a sample ID, and a sample container height.

FIG. 6 is a diagram illustrating a configuration in which all the sensors forming the container height detection device are disposed on the same side as an identification information reading device as a comparative example.

FIG. 7 is a diagram illustrating a condition to be satisfied as disposition of the container height detection device.

FIG. 8 is a diagram illustrating a configuration in which a part of the sensors forming the container height detection device is disposed on the opposite side of the identification information reading device as Embodiment 1.

FIG. 9A is a diagram illustrating a state of the sample container viewed from each sensor when all the sensors are disposed on the same side as the comparative example.

FIG. 9B is a diagram illustrating a state of the sample container viewed from the sensor when only a part of the sensors is disposed on the opposite side as Embodiment 1.

FIG. 10A is a diagram illustrating a configuration of the container height detection device when all the sensors are disposed on the same side as the comparative example.

FIG. 10B is a diagram illustrating a configuration of the container height detection device when a part of the sensors is disposed on the opposite side as Embodiment 1.

FIG. 11A is a diagram illustrating a configuration of sensors to be disposed horizontally.

FIG. 11B is a diagram illustrating a configuration of sensors to be disposed vertically.

DESCRIPTION OF EMBODIMENTS

Hereinafter, embodiments of the invention will be described in detail with reference to the drawings.

Embodiment 1

FIG. 1 is a diagram showing a basic configuration of an automatic analyzer according to Embodiment 1. As shown in FIG. 1, the automatic analyzer of the present embodiment is implemented by connecting one or more identical or different analysis modules 200 and a conveyance module 100 that conveys a sample rack 10 on which one or more sample containers 12 containing samples to be analyzed in the analysis modules are mounted. In the present embodiment, a configuration in which one biochemical analyzer is connected as the analysis module 200 will be described, but the invention is not limited thereto. Other analyzers such as an immunoanalyzer and a blood coagulation analyzer, and an analyzer that performs the same type of analysis on left and right sides can be appropriately disposed according to a use environment.

The sample container 12 contains a biological specimen (sample) such as serum, plasma, or urine. The sample rack 10 includes a sample rack on which a sample container containing a normal sample to be analyzed with a normal priority is mounted and a sample rack on which a sample container containing an emergency sample having a higher degree of urgency of analysis than the normal sample is mounted.

The conveyance module 100 is a module that conveys the sample rack 10 to be loaded into the automatic analyzer between the conveyance module 100 and the analysis module 200, and includes a sample rack conveyance line 104, an emergency sample rack loading portion 101, a sample rack supply unit 102, a sample rack storage unit 103, a sample rack distribution unit 107, an identification information reading device 105, and a container height detection device 106. The sample rack conveyance line 104 is a line for reciprocating the sample rack 10 loaded into the automatic analyzer between the sample rack conveyance line 104 and the sample rack distribution unit 107. The emergency sample rack loading portion 101 is adjacent to the sample rack conveyance line 104, and is for loading an emergency sample rack 11.

The sample rack supply unit 102 is closer to one end side of the sample rack conveyance line 104 (a sample rack distribution unit 107 side) than the emergency sample rack loading portion 101, and supplies the sample rack 10 for the normal sample to the sample rack conveyance line 104. The sample rack storage unit 103 is closer to the one end side of the sample rack conveyance line 104 than the sample rack supply unit 102, and stores a sample rack sent out from the sample rack conveyance line 104. The sample rack distribution unit 107 is disposed at one end of the sample rack conveyance line 104, includes a sample rack standby disc having one or more slots on which the sample rack 10 can be mounted, and transfers the sample rack 10 between the one end of the sample rack conveyance line 104 and one end of a dispensing line 202 of one or more analysis modules.

The identification information reading device 105 reads identification information (sample ID 14) attached to the sample container 12 and identification information (rack ID 13) attached to the sample rack 10 and the emergency sample rack 11. The sample ID 14 and the rack ID 13 are displayed by an identification medium such as a bar code or an RFID, and are used to inquire about analysis request information related to the sample.

The container height detection device 106 detects a height of the sample container 12, and includes a plurality of sensors 106*a* to 106*e* having different height ranges for a detection target, although details of a structure and a detection method will be described later. Data detected by the container height detection device 106 is sent to a control unit 301 to be described later. The control unit 301 checks whether the sample container 12 is placed at a position in the sample rack 10 and the emergency sample rack 11 and determines a type of the sample container 12.

The sample rack 10 supplied to the sample rack supply unit 102 of the automatic analyzer according to the present embodiment moves to a rack ID reading position, a height detection and sample ID reading position 112, and a standby disc position in this order by operating the sample rack conveyance line 104 of the conveyance module 100.

First, when a tip end (one end side) of the sample rack 10 reaches the rack ID reading position, the identification information reading device 105 reads the rack ID 13 attached to a curved surface portion of the tip end of the rack. Thereafter, when the leading (one end side) sample container 12 among the plurality of sample containers 12 mounted on the sample rack 10 reaches the height detection and sample ID reading position 112, the container height detection device 106 detects a height of the leading sample container 12, and the identification information reading device 105 reads the sample ID 14 of the leading sample container 12 according to a height detection result. That is, the container height detection device 106 and the identification information reading device 105 perform reading and detection when the sample container 12 is at a common position on the sample rack conveyance line 104. Even when the sample rack 10 moves to the one end side after the container height detection device 106 detects the height of the sample container 12 and before the identification information reading device 105 performs reading, if the identification information reading device 105 can read the sample ID 14 of the same sample container 12, a movement range thereof can be regarded as the common position.

Meanwhile, the emergency sample rack 11 loaded into the emergency sample rack loading portion 101 of the automatic analyzer according to the present embodiment first temporarily stands by at an emergency sample rack standby position 111 that is closer to the other end side of the sample rack conveyance line 104 (an opposite side of the sample rack distribution unit 107) than the rack ID reading position. Thereafter, the emergency sample rack 11 moves to the rack ID reading position, the height detection and sample ID reading position 112, and the standby disc position in this order, similarly to the normal sample rack 10 described above.

Thus, in the present embodiment, the identification information reading device 105 and the container height detection device 106 are provided at relatively close positions, and identification information reading and container height detection are collectively performed at one position, so that a conveyance distance can be shortened, and then the automatic analyzer can be miniaturized as a whole.

The analysis module 200 is a module for dispensing a sample in the sample container 12 mounted on the sample rack 10 and performing qualitative and quantitative analyses, and includes the dispensing line 202, an identification information reading device 203 for analysis module, a sample dispensing mechanism 204, a reagent dispensing mechanism 207, and a measurement unit 208. The dispensing line 202 carries in the sample rack 10 or the emergency sample rack 11 held by the sample rack distribution unit 107 from the one end, and reciprocates the sample rack 10 or the emergency sample rack 11 to a dispensing position for dispensing the sample from the sample container 12. The identification information reading device 203 for analysis module reads the rack ID 13 attached to the sample rack 10 or the emergency sample rack 11 carried into the dispensing line 202 and the sample ID 14 attached to the sample container 12 mounted on the racks, and collates the analysis request information and the like related to the sample. The sample dispensing mechanism 204 dispenses the sample from the sample container 12 on the sample rack 10 or the emergency sample rack 11 conveyed to the dispensing position on the dispensing line 202 to a reaction container of a reaction disc 205 or an incubator disc (not shown). The reagent dispensing mechanism 207 dispenses a reagent in a reagent container of a reagent disc 206 to the reaction container of the reaction disc 205 or the incubator disc. The measurement unit 208 measures a mixed liquid (reaction liquid) of the sample and the reagent dispensed into the reaction container, and performs qualitative and quantitative analyses.

A control device 300 controls an overall operation of the automatic analyzer, and includes a display unit 303, an input unit 304, a storage unit 302, and the control unit 301. The display unit 303 displays an input screen for various parameters and settings, analysis inspection data on an initial inspection or a re-inspection, measurement results, and the like. The input unit 304 is used when an operator inputs various parameters, settings, analysis request information, instructions to start analysis, and the like. The storage unit 302 stores various parameters, settings, measurement results, analysis request information on a sample in the sample container mounted on the sample rack, and the like. The control unit 301 controls the overall operation of the automatic analyzer including the control device 300. The conveyance module 100 and the analysis module 200 may be individually provided with a control unit to control an operation of each unit in the module.

FIG. 2 is a diagram showing a state in which a plurality of sample containers 12 are mounted on the sample rack 10. Here, the normal sample rack 10 will be described, but the same applies to a case of using the emergency sample rack 11. A side surface corner portion on the one end side of the sample rack 10 has a curved surface 10*a* curved from a side facing the sample rack conveyance line 104 to a conveyance destination side, and the rack ID 13 is attached along the curved surface 10*a*. Therefore, the identification information reading device 105 can read the rack ID 13 even when a reading direction is not perpendicular to a conveyance direction of the sample rack conveyance line 104. That is, the identification information reading device 105 can be disposed at a position deviated to a certain extent on the conveyance destination side (+Y axis side in FIG. 2) with respect to the side surface corner portion of the sample rack 10 at the rack ID reading position.

The sample container 12 held by the sample rack 10 may also have the sample ID 14. When the sample ID 14 is a bar code, the sample container 12 to which the sample ID 14 is attached is generally limited to a test tube because a size (height dimension) in which the bar code can be attached is required. Since the sample ID 14 is also read by the identification information reading device 105, when the sample container 12 reaches the height detection and sample ID reading position 112, the operator mounts the sample container 12 on the sample rack 10 such that the sample ID 14 faces the identification information reading device 105. Since a surface of the sample container 12 to which the sample ID 14 is attached is also a circular curved surface, the sample ID 14 can be read even when the identification information reading device 105 is disposed at a position deviated in the conveyance direction of the sample rack conveyance line 104 with respect to a center of a width of the sample ID 14 as a reference.

FIG. 3 is a diagram showing a structure of the container height detection device 106 and a method for detecting a height of the sample container 12. As shown in FIG. 3, the container height detection device 106 includes a plurality of sensors 106*a* to 106*e* having different installation heights. Although FIG. 3 shows a case where there are five sensors, the number of sensors is not limited to five. Each sensor is a reflective sensor, and stands by for detection in advance in a state where there is no object (sample container 12) in a detection area, and detects presence of an object by sensing reflected light from the object when the object enters the detection area. After the detection of the sample container 12 at a predetermined position in the sample rack 10 is completed, the sensor is reset in a gap between front and rear sample containers 12 in order to detect a next sample container 12.

FIG. 3 shows an example in which, as the sample container 12, a cup 12*a*, test tubes 12*b* and 12*d*, and test tubes 12*c* and 12*e* on which cup is placed are mounted on different sample racks 10. A height at which each sensor is installed is determined such that the sample containers 12 having different heights can be distinguished. Accordingly, for example, in the case of the cup 12*a* having the smallest height, it is assumed that the sensors 106*a* to 106*d* do not perform detection and the sensor 106*e* performs detection, and the control unit 301 receiving a detection result determines that the type of the sample container 12 is a cup.

FIG. 4 is a diagram showing the structure of the container height detection device 106 and a method for detecting the height of a sample container 12*f* with a lid. Even if the sample container 12*f* with a lid is of the same type, an opening degree of the lid may differ, and depending on the opening degree, the sample container 12*f* with a lid may or may not enter detection areas of the sensor 106*c* and the sensor 106*d*. Further, depending on a placement direction of the sample container 12*f* with a lid and a support structure for the lid, a gap between the sample container 12*f* with a lid and an adjacent sample container 12 may be blocked, and the container height detection device 106 may not be reset.

In the present embodiment, identification information indicating that there is a possibility that the sample container 12*f* with a lid is mounted is displayed in the rack ID 13 attached to a sample rack 10*f* for a container with a lid on which the sample container 12*f* with a lid is mounted. Therefore, when the identification n information reading device 105 reads the rack ID 13 of the sample rack 10*f* for a container with a lid, the control unit 301 may determine presence or absence of the sample container 12*f* with a lid at each position in the sample rack 10*f* for a container with a lid by a method different from the above determination method.

FIG. 5 is a flowchart showing a process of reading and detecting the rack ID 13, the sample ID 14, and a sample container height.

First, the sample rack conveyance line 104 starts an operation (step S1). Next, the control unit 301 determines presence or absence of an emergency sample (step S2). If it is determined that the emergency sample is "present", the control unit 301 controls the sample rack conveyance line 104 to convey the emergency sample rack 11 loaded by the emergency sample rack loading portion 101 to the rack ID reading position (step S3). On the other hand, in step S2, if it is determined that the emergency sample is "absent", the control unit 301 controls the sample rack conveyance line 104 to convey the sample rack 10 supplied by the sample rack supply unit 102 to the rack ID reading position (step S4).

Hereinafter, an example of the case of the emergency sample being "absent" will be described. The identification information reading device 105 reads the rack ID 13 when the sample rack 10 is at the rack ID reading position (step S5). At this time, since none of the sample containers 12 on the sample rack 10 is in a detection area of the container height detection device 106, the sensor of the container height detection device 106 is reset in this state (step S6).

Next, the control unit 301 further operates the sample rack conveyance line 104 to send the first sample container 12 in conveyance direction among the plurality of sample containers 12 mounted on the sample rack 10 to the height detection and sample ID reading position 112 (step S7). At this time, the container height detection device 106 detects a height of the sample container 12 (step S8), and transmits a detection result to the control unit 301. Next, the identification information reading device 105 reads the sample ID 14 (step S9). At a time point in step S8, the control unit 301 may determine a type of the sample container 12 based on the detection result, and the identification information reading device 105 may read the sample ID 14 only when it is determined that the sample container 12 has the sample ID 14, such as being a test tube. Alternatively, when the rack ID 13 read in step S5 includes information indicating that the sample container 12 having the sample ID 14 is mounted, the identification information reading device 105 may read the sample ID 14.

Thereafter, the control unit 301 determines whether detection and reading of all sample containers 12 mounted on the sample rack 10 are completed (step S10). If there is a sample container 12 that was not read and detected, the control unit 301 further operates the sample rack conveyance line 104 to send the sample container 12 adjacent to the sample container 12 that was detected and read most recently to the height detection and sample ID reading position 112 (step S11). At this time, there is no object in the detection area of the container height detection device 106 between the front and rear sample containers 12, and the sensor in the container height detection device 106 is reset and the container height detection device 106 prepares for a next detection.

As a result of repeating steps S8 to S11, if it is determined in step S10 that the detection and reading of all the sample containers 12 are completed, the control unit 301 checks whether each sample container 12 is placed at a respective position and determines a type of the sample container 12 based on the detection result received from the container height detection device 106 (step S12). Thereafter, the control unit 301 further operates the sample rack conveyance line 104 to send the sample rack 10 to the standby disc position in the sample rack distribution unit 107 (step S13). Here, if there is no abnormality as a result of the determination in step S12, the sample rack distribution unit 107 causes the sample rack 10 to stand by until the sample rack 10 is conveyed to the analysis module 200 for analysis of the sample. The control unit 301 determines a conveyance destination in the analysis module 200 and a sample dispensing process at the conveyance destination based on the analysis request information read by the identification information reading device 105 and information such as the type of the sample container 12 determined using the container height detection device 106. On the other hand, if there is an abnormality as the result of determination in step S12, the sample rack 10 is sent to the sample rack storage unit 103 without being conveyed to the analysis module 200.

FIG. 6 is a diagram showing a configuration in which all sensors constituting the container height detection device 106 are disposed on the same side as the identification information reading device 105 with respect to the sample rack conveyance line 104 as a comparative example. As shown in FIG. 6, the identification information reading device 105 is disposed at an angle θ1 in a direction of backward flow from a conveyance destination to a conveyance source for the sample rack conveyance line 104, and the container height detection device 106 is disposed at an angle θ2 in a direction of forward flow from the conveyance source to the conveyance destination for the sample rack conveyance line 104. Specifically, the identification information reading device 105 is disposed on a line defining the angle θ1 with a line AA' passing through the height detection and sample ID reading position 112 and perpendicular to the sample rack conveyance line 104, and the container height detection device 106 is disposed on a line defining the angle θ2 with the same line AA' (θ2 is on an opposite side of θ1 with respect to the line AA').

The angle θ1 has a value of $0° \leq \theta 1 < 90°$, and a smaller value is desirable. This is because as θ1 increases, a detection width of the identification information reading device 105 includes the sample ID 14 of the next sample container 12 in addition to the sample ID 14 of the sample container 12 to be detected, which may cause erroneous reading of identification information.

The angle θ2 has a value of $0° \leq \theta 2 < 90°$, and a smaller value is also desirable. Conditions to be satisfied by the angle θ2 will be described with reference to FIG. 7.

FIG. 7 is a diagram showing conditions to be satisfied in arrangement of the container height detection device 106. In FIG. 7, a distance between centers of adjacent sample containers 12 is d, a radius of the sample container 12 having the largest diameter is r, and a detection width of a detection area 503 of the sensor constituting the container height detection device 106 is w. Here, if a gap between the sample containers 12 when viewed from the sensor is not wider than the detection width of the sensor, the container height detection device 106 cannot identify that the sample container 12 as the detection target is changed to next (cannot be reset), and thus it is necessary to satisfy $d \cos \theta 2 - 2r > w$. That is, the condition to be satisfied by the angle θ2 is $\cos \theta 2 > (2r+w)/d$. Further, in order to prevent detection areas of the identification information reading device 105 and the container height detection device 106 from interfering with each other, the angle θ1+the angle θ2 needs to be a certain angle or more.

However, among the sample containers 12, there is a sample container in which a part of the container protrudes beyond the radius r in the above condition, such as the sample container 12*f* with a lid, and even when such a sample container 12 satisfies the above condition, the container height detection device 106 cannot be reset, and an error may occur. When the sample rack conveyance line 104 is short and the automatic analyzer is miniaturized, it may be difficult to arrange the container height detection device 106 at the angle θ2.

FIG. 8 is a diagram showing a configuration in which a part of the sensors constituting the container height detection device 106 is disposed on an opposite side of the identification information reading device 105 with respect to the sample rack conveyance line 104 as the present embodiment. As shown in FIG. 8, the sensor 106*e* is disposed on the line AA' perpendicular to the sample rack conveyance line 104. Since there is no other device such as the identification information reading device 105 around the sensor 106*e*, a degree of freedom of layout is high. A light projecting direction of the sensor 106*e* does not necessarily have to be perpendicular to the conveyance direction of the sample rack conveyance line 104, and a certain effect can be obtained as long as the light projecting direction of the sensor 106*e* is closer to a direction perpendicular to the conveyance direction than light projecting directions of the sensors 106*a* to 106*d*.

Next, which sensor of the plurality of sensors constituting the container height detection device 106 is to be disposed on an opposite side of the other sensors will be described. FIG. 10A is a diagram showing a configuration of the container height detection device when all the sensors 106*a* to 106*e* are disposed on the same side as the identification information reading device 105 as a comparative example. FIG. 10B is a diagram showing a configuration of the container height detection device when the sensor 106*e* is disposed on an opposite side of the identification information reading device 105 as the present embodiment.

A gap between the plurality of sample containers 12 mounted on the sample rack 10 along the conveyance direction of the sample rack conveyance line 104 is likely to be the smallest at the lowest position. When the sensor with this height is inclined at a large angle with a vertical direction with respect to the conveyance direction of the sample rack conveyance line 104 as a reference, a gap between adjacent sample containers 12 cannot be detected, and an error is likely to occur. Therefore, in the present embodiment, as shown in FIG. 10B, the sensor disposed on the opposite side of the identification information reading device 105 is the sensor 106*e* having the lowest height range for the detection target. Since a detection area of the lowest sensor 106*e* is away from a detection area when the identification information reading device 105 reads the sample ID 14, a possibility of an erroneous detection is low. Depending on a type of the sample container 12 to be used and a position of the identification information reading device 105, a height at which the gap is likely to be narrowed and a height at which an erroneous detection is likely to be performed may be different, and thus the sensor to be disposed on the opposite side is not limited to the lowermost sensor.

Next, an effect of arranging a part of the sensors of the container height detection device 106 at a different place will be described based on FIGS. 9A and 9B. In FIGS. 9A and 9B, the sample ID 14 attached to the sample container 12 is omitted.

FIG. 9A is a diagram showing a state of the sample container 12 viewed from the sensors when all the sensors are disposed on the same side with respect to the sample rack conveyance line 104 as a comparative example. As shown in FIG. 9A, in the case of the comparative example, the third, fourth, and fifth sample containers 12 from the leading one appear to be connected without a gap as viewed from the sensors. That is, since container height detection is not reset, the fourth and fifth sample containers 12 from the leading one cannot be detected, resulting in a detection error.

FIG. 9B is a diagram showing a state of the sample container 12 viewed from the sensor 106*e* when only the sensor 106*e* is disposed on the opposite side of the other sensors with respect to the sample rack conveyance line 104 as the present embodiment. As shown in FIG. 9B, in the case of the present embodiment, a gap appears to be formed between the third sample container 12 and the fourth sample container 12 and between the fourth sample container 12 and the fifth sample container 12 from the leading one viewed from the sensor 106*e*. That is, the container height detection is reset, and the fourth and fifth sample containers 12 can also be individually recognized, and a detection error does not occur. As a result, even when a gap between adjacent sample containers 12 is small, an accurate detection result is transmitted from the container height detection device 106 to the control unit 301, and presence or absence and a type of the sample container 12 can be determined.

Here, when the container height detection device 106 is attached to the automatic analyzer, an installation angle of the sensor may vary due to an attachment error, and a deviation of the installation angle may lead to a detection error. When all the sensors are attached at the angle $\theta 2$ as in the comparative example, in particular, the sensor 106*e* that detects the height range in which a distance between the sample containers 12 is the shortest is required to have high attachment accuracy, and a detection error may occur even with a slight deviation from the angle $\theta$.

On the other hand, in the present embodiment, since an angle of the sensor 106*e* is smaller than the angle $\theta 2$ and preferably zero, even when the installation angle is deviated due to the attachment error, a detection error is less likely to occur. In other words, the automatic analyzer of the present embodiment improves attachment workability of the container height detection device 106. In the present embodiment, by effectively utilizing a space between the sample rack supply unit 102 and the sample rack storage unit 103, it is possible to arrange the sensor 106*e* on the opposite side of the other sensors of the container height detection device 106 and the identification information reading device 105 sandwiching the sample rack conveyance line 104.

Embodiment 2

In Embodiment 1, the configuration in which all the reflective sensors constituting the container height detection device 106 are disposed in a horizontal direction is described. In Embodiment 2, the reflective sensor 106*e* disposed on the opposite side of the identification information reading device 105 is vertically disposed.

FIG. 11A is a diagram showing a configuration of the sensors 106*a* to 106*d* disposed horizontally. As shown in FIG. 11A, the sensors 106*a* to 106*d* are disposed such that a light emitting unit 501 and a light receiving unit 502 are disposed in the horizontal direction, and the detection width w is large in the horizontal direction.

FIG. 11B is a diagram showing a configuration of the sensor 106*e* disposed in the vertical direction. As shown in FIG. 11B, the sensor 106*e* is disposed such that the light emitting unit 501 and the light receiving unit 502 are disposed in the vertical direction, and the detection width w is small in the horizontal direction. Therefore, even when a gap between adjacent sample containers 12 is small, the gap can be recognized with high sensitivity, and the container height detection can be reset. As a result, the control unit 301 can accurately determine presence or absence and the type of the sample container 12 mounted on the sample rack 10 or the emergency sample rack 11. Since there is no other sensor around the sensor 106*e*, it is easy to install the sensor 106*e* in the vertical direction.

The invention is not limited to the embodiments described above, and includes various modifications. The above embodiments are described in detail for easy understanding of the invention, and the invention is not necessarily limited to those including all configurations described above. A part of the configuration of a certain embodiment can be replaced with a configuration of another embodiment, and a configuration of another embodiment can be added to a configuration of a certain embodiment. A part of a configuration of each embodiment can be added to, deleted from, or replaced with another configuration.

REFERENCE SIGNS LIST

10: sample rack
10*a*: curved surface
10*f*: sample rack for container with lid
11: emergency sample rack
12: sample container
12*a*: cup
12*b*, 12*d*: test tube
12*c*, 12*e*: test tube on which cup is placed
12*f*: sample container with lid
13: rack ID
14: sample ID
100: conveyance module
101: emergency sample rack loading unit
102: sample rack supply unit
103: sample rack storage unit
104: sample rack conveyance line
105: identification information reading device
106: container height detection device
106*a* to 106*e*: sensor
107: sample rack distribution unit
111: emergency sample rack standby position
112: height detection and sample ID reading position
200: analysis module
202: dispensing line
203: identification information reading device for analysis module
204: sample dispensing mechanism
205: reaction disc
206: reagent disc
207: reagent dispensing mechanism
208: measurement unit
300: control device
301: control unit
302: storage unit
303: display unit
304: input unit
501: light emitting unit
502: light receiving unit
503: detection area

The invention claimed is:

1. An automatic analyzer, comprising:

a conveyance line for conveying a loaded sample container;

an identification information reading device adapted to read identification information attached to the sample container; and a container height detection device adapted to detect a height of the sample container, wherein the identification information reading device and the container height detection device are adapted to perform reading and detection when the sample container is at a common position on the conveyance line, the container height detection device includes a plurality of sensors having different height ranges for a detection target, each of the plurality of sensors being adapted to detect the presence of the sample container as the detection target by sensing light reflected from the sample container when the sample container is at the common position on the conveyance line, a part of the plurality of sensors is disposed on the same side as the identification information reading device with respect to the conveyance line, and the rest of the plurality of sensors are disposed on the opposite side of the identification information reading device with respect to the conveyance line.

2. The automatic analyzer according to claim 1, wherein the sensor whose detection target is a height range in which a distance between the plurality of sample containers mounted on a sample rack along a conveyance direction of the conveyance line is the closest is disposed on the opposite side of the identification information reading device.

3. The automatic analyzer according to claim 1, wherein the sensor whose height range for the detection target is the lowest is disposed on the opposite side of the identification information reading device.

4. The automatic analyzer according to claim 1, wherein a light emission direction of the sensor disposed on the opposite side of the identification information reading device is closer to a direction perpendicular to the conveyance direction of the conveyance line than a light emission direction of the sensor disposed on the same side as the identification information reading device.

5. The automatic analyzer according to claim 1, wherein the identification information reading device is also adapted to read identification information attached to a sample rack on which the sample container is mounted.

6. The automatic analyzer according to claim 1, wherein the sensor disposed on the opposite side of the identification information reading device is disposed so that a light emitting unit and a light receiving unit are disposed in a vertical direction.

* * * * *